United States Patent
Okazaki et al.

(10) Patent No.: US 9,156,112 B2
(45) Date of Patent: Oct. 13, 2015

(54) WELDING SOLID WIRE AND WELD METAL

(75) Inventors: Yoshitomi Okazaki, Kobe (JP); Hidenori Nako, Kobe (JP); Munenobu Sato, Fujisawa (JP); Masafumi Yamakami, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 144 days.

(21) Appl. No.: 13/996,865

(22) PCT Filed: Dec. 22, 2010

(86) PCT No.: PCT/JP2010/073250
§ 371 (c)(1),
(2), (4) Date: Jun. 21, 2013

(87) PCT Pub. No.: WO2012/086042
PCT Pub. Date: Jun. 28, 2012

(65) Prior Publication Data
US 2013/0270246 A1 Oct. 17, 2013

(51) Int. Cl.
*B23K 35/00* (2006.01)
*B23K 35/30* (2006.01)
*B23K 9/025* (2006.01)
(Continued)

(52) U.S. Cl.
CPC ............. *B23K 35/3066* (2013.01); *B23K 9/025* (2013.01); *B23K 9/035* (2013.01); *B23K 9/173* (2013.01); *B23K 9/23* (2013.01); *B23K 35/0261* (2013.01); *B23K 35/383* (2013.01); *B23K 2203/04* (2013.01)

(58) Field of Classification Search
CPC .... B23K 35/00; B23K 35/004; B23K 35/002; B23K 35/0255; B23K 35/0261; B23K 35/3033; B23K 9/173
USPC ............... 219/137 WM, 145.1, 146.1, 146.41
See application file for complete search history.

(56) References Cited

U.S. PATENT DOCUMENTS

2010/0206130 A1* 8/2010 Nako et al. ...................... 75/302

FOREIGN PATENT DOCUMENTS

| CN | 101808774 A | 8/2010 |
|---|---|---|
| JP | 53 118241 | 10/1978 |
| JP | 54 76452 | 6/1979 |
| JP | 54 121247 | 9/1979 |
| JP | 57 171598 | 10/1982 |
| JP | 61 15925 | 1/1986 |
| JP | 7 303995 | 11/1995 |
| JP | 2009 90312 | 4/2009 |

(Continued)

OTHER PUBLICATIONS

International Search Report Issued Mar. 22, 2011 in PCT/JP10/073250 Filed Dec. 22, 2012.

*Primary Examiner* — Brian Jennison
(74) *Attorney, Agent, or Firm* — Oblon, McClelland, Maier & Neustadt, L.L.P.

(57) ABSTRACT

The objective of the present invention is to provide a similar-metal-composition welding solid wire, and weld metals therefor, with which both excellent bead shape and high ultralow-temperature toughness for the weld joints can be achieved when welding 9% Ni steels together by means of a high-efficiency MIG welding method. A fixed ratio of a REM and O are included in a similar-metal-composition welding solid wire of a 9% NI steel base material, and oxygen is supplied in a trace amount in a range that does not hinder the ultralow-temperature toughness of the weld joint (1a) but that is capable of forming fine REM oxides in the weld metal (3) and of controlling the weld metal to produce an excellent bead shape. In addition, both Al and Ti are regulated and an argon gas that contains little or no carbon dioxide gas is used as the shield gas in the MIG welding method. Thus, both an excellent bead shape and high ultralow-temperature toughness for the weld joint (1a) can be achieved.

5 Claims, 1 Drawing Sheet

(51) Int. Cl.
*B23K 9/035* (2006.01)
*B23K 9/173* (2006.01)
*B23K 9/23* (2006.01)
*B23K 35/02* (2006.01)
*B23K 35/38* (2006.01)

(56) References Cited

FOREIGN PATENT DOCUMENTS

| | | |
|---|---|---|
| JP | 2009 101414 | 5/2009 |
| JP | 2010 172907 | 8/2010 |

* cited by examiner

WELDING SOLID WIRE AND WELD METAL

TECHNICAL FIELD

The present invention relates to an iron-based welding solid wire suitable for welding of 9% Ni steel (9% nickel steel) for ultralow-temperature service, and to weld metal of a weld joint between 9% Ni steel pieces. Hereinafter, the weld joint between 9% Ni steel pieces may be simply referred to as "joint".

BACKGROUND ART

As well known, 9% Ni steel is high-tensile steel used at ultralow temperature of about −196° C., and has high yield strength and excellent low-temperature toughness. The 9% Ni steel is therefore widely used, as ultralow-temperature steel, for storage tanks for, for example, LNG, liquid nitrogen, and liquid oxygen, or various types of associated equipment thereof. To effectively use such excellent ultralow-temperature toughness of the 9% Ni steel, a weld metal of a weld joint formed by welding between 9% Ni steel pieces is naturally required to have substantially the same properties of, such as ultralow-temperature toughness, as those of the base metal.

Under such circumstances, various investigations have been made on a technique for welding between 9% Ni steel pieces. For example, it is expected that when a welding wire (so-called similar-metal-composition welding wire) having a composition equal or similar to that of 9% Ni steel base metal for ultralow-temperature service is used for welding of the 9% Ni steel, a weld joint having excellent ultralow-temperature property is produced. A welding process such as MIG welding that is more efficient than TIG welding, however, cannot secure stable low-temperature toughness. Since MIG welding has such a difficulty in low-temperature toughness, the welding process is limited to TIG welding despite its lower welding efficiency, resulting in extremely low operation efficiency. Hence, the similar-metal-composition wire has been substantially not used.

FIG. 1 illustrates an example of a flash butt weld joint (welding test example) between 9% Ni steel plates. In either TIG welding or MIG welding, a weld metal 3 of a weld joint 1a between 9% Ni steel plates 2a and 2b is formed through the same process of sequential formation of deposition beads (1) to (13) in a multilayered manner with high heat input. In FIG. 1, a symbol 5 indicates a backing metal.

In TIG welding, a relatively small amount of deposition is made so that a thin bead is produced; hence, for example, a bead (12) is completely reversely transformed by, for example, a subsequent bead (13). As a result, a relatively coarse unaffected zone (solidified structure) of each deposition layer is transformed into a fine reheated structure. Specifically, a structure of a lower layer is refined due to an appropriate heat treatment effect caused by a heat cycle during welding of an upper layer, leading to improvement in low-temperature toughness of the lower layer.

In contrast, in highly efficient MIG welding, a relatively large amount of deposition is made, which therefore necessarily results in alternate disposition of the reheated structures and the unreheated, unaffected zones (solidified structures) in a thickness direction. As a result, the weld metal 3 of the joint 1a formed by MIG welding is difficult to have stable low-temperature toughness compared with that formed by TIG welding.

Hence, a welding wire of a Ni-based alloy (so-called Inconel) having the Ni content of as high as about 60% has been mainly used for welding of 9% Ni steel by highly efficient MIG welding. The weld joint formed with such a Ni-based alloy welding wire exhibits excellent toughness even at −196° C. in the as-welded condition, which is however extremely low in tensile strength, particularly in 0.2% yield strength, compared with a 9% Ni steel base metal. As a result, although 9% Ni steel as high-tensile steel is used, design stress must be reduced due to the low strength of the weld joint. Consequently, thickness of a welded structure as a whole must be disadvantageously increased to secure certain strength of the weld joint.

Hence, as long as the Ni-based alloy welding wire is used, the high strength of 9% Ni steel is not sufficiently used, which inevitably leads to multiple loads or burdens such as an increase in thickness and in weight of a welded structure, and an increase in consumption of the expensive Ni-based alloy welding wire. In addition, if welding is performed using the Ni-based alloy welding wire, there inevitably occurs a problem of hot crack associated with Ni, and a problem of thermal fatigue that is caused by a difference in thermal expansion coefficient between the Ni-based alloy welding wire and the 9% Ni steel base metal during welding due to a significant difference in composition therebetween.

Although 9% Ni steel itself has the excellent properties of the ultralow-temperature steel as described above, applicability thereof has been in fact extremely limited due to the above-described limitations in welding operation.

Thus, a study has been made on a welding technique using a similar-metal-composition welding wire, which has a composition equal or similar to that of the 9% Ni steel base metal, in place of the Ni-based alloy welding wire in order to improve the ultralow-temperature property of the weld joint using the similar-metal-composition welding wire.

For example, PTL1 discloses a method of improving the ultralow-temperature property by adjusting and/or limiting, within an appropriate range, the content of each of nickel, manganese, boron, and oxygen in a chemical composition of the similar-metal-composition welding wire for 9% Ni steel. PTL1 reports results of improvement in low-temperature toughness of a weld joint evaluated by the Charpy impact test in accordance with JIS-Z-3111, which is however evaluated only in terms of the entire absorbed energy. In other words, no investigation is made in terms of crack initiation strength.

PTL2 proposes a method of improving low-temperature toughness of a weld joint through designing a welding operation process using the similar-metal-composition welding wire for 9% Ni steel. Specifically, PTL2 discloses a method where the surface of a final-layer weld bead in multilayer welding is cooled to 150° C. or less, and then the surface of the final-layer weld bead is remelted by arc from a non-consumable electrode while being shielded by an inert gas. This method is intended to improve the low-temperature toughness by applying heat treatment to the final layer in a groove center through remelting of the final layer that is less likely to receive a heat treatment effect due to the heat cycle during welding of an upper layer. This method, however, causes a problem of an increase in number of steps in welding operation, and merely improves the low-temperature toughness of only the final welding layer as a part of the weld joint. Hence, low-temperature toughness of the entire weld metal, which dominates the properties of the weld joint, is naturally limitedly improved.

PTL3 proposes a technique for improving low-temperature toughness through control of carbide morphology and decrease of heat treatment time of a weld bead portion in welding using the similar-metal-composition welding wire for 9% Ni steel. In this technique, a similar-metal-composition welding wire is used in Example, where the welding wire contains 0.042% or more REM (Rare Earth Metal) added thereto though there is no description is made on the reason why REM is added. The technique also causes an increase in number of steps due to the heat treatment required after welding as in PTL2, which in turn causes an increase in cost. Moreover, wire compositions are not sufficiently investigated. In addition, the low temperature toughness required in light of the crack-initiation resistance strength is also not considered. REM refers to Rare Earth Metal, and is a general term of elements of La to Lu in the periodic table.

While such improvements in low-temperature toughness have been made using the similar-metal-composition welding wire for 9% Ni steel, they are in common lacking in the viewpoint of elucidation from crack initiation, i.e., the viewpoint of crack-initiation resistance strength reflecting actual crack initiation. Hence, the low-temperature toughness required for actual structures has not been evaluated in detail though sufficient low-temperature toughness satisfying a certain criterion is achieved in evaluation of absorbed energy by a Charpy impact test or a COD test for evaluation of typical low-temperature toughness.

On the other hand, techniques for improving the low-temperature toughness by the similar-metal-composition welding wire for 9% Ni steel are quite recently proposed, for example, in PTL4 and PTL5, which also include development of the evaluation method itself of the low-temperature toughness from the viewpoint of the crack-initiation resistance strength.

As disclosed in PTL4 and PTL5, when external force (a load) is actually applied to a welded structure such as the storage tank for, for example, LNG, liquid nitrogen, and liquid oxygen, or associated equipment thereof, a crack is initiated and then propagated. To evaluate the low-temperature toughness required based on crack-initiation resistance strength reflecting such actual crack initiation, it is indispensable to measure the toughness from the start to the end of a crack initiation during application of the external force.

A test method of ultralow-temperature toughness, achieving such measurement, includes an instrumented Charpy impact test method, which provides a load displacement curve that allows separation between crack initiation and a crack propagation process during a Charpy impact test. This measurement method allows measurement of a toughness value (absorbed energy) Ei at crack initiation under application of external force, measurement of a toughness value (absorbed energy) Ep during crack propagation from the start to the end of a crack, and measurement of the crack-initiation resistance strength (the maximum load). The total toughness value Et (Ei+Ep) of Ei and Ep and the above-described crack-initiation resistance strength enable more detailed evaluation of ultralow-temperature toughness in correspondence to large-size brittle fracture strength of an actual welded structure.

From such a viewpoint, the technology of PTL4 improves the ultralow-temperature toughness particularly by adding Cr (chromium). Specifically, during multilayer welding by TIG welding, a lower layer in the center of a weld metal in a groove is subjected to a heat treatment effect caused by a heat cycle during previous welding of an upper layer. During this process, if an initial structure, which has been transformed into a bainite or martensite structure after welding, of the lower bead in the center of the weld metal is reversely transformed into austenite by the heat treatment effect, the structure of the weld metal is easily refined. In a composition system of the 9% Ni steel containing Ni and Mn, Cr has an excellent function of reducing the ferrite-austenite transformation temperature. In the technology of PTL4, a specified amount of Cr is contained in the similar-metal-composition wire to use such a unique property of Cr, which allows the structure of the weld metal to be refined, resulting in improvement in crack-initiation resistance strength of the weld joint.

Similarly, the technology of PTL5 improves the ultralow-temperature toughness particularly by adding REM. In general, oxides extremely degrade the low-temperature toughness; hence, it is not preferable to form a large number of large oxides in the weld metal of the joint between 9% Ni steel pieces. If, however, an oxide, which is formed through a reaction with a small amount of oxygen in the weld metal, is sufficiently small, such an oxide does not serve as an initiation site of fracture, but rather advantageously serves as a pinning grain that inhibits crystal grain growth during or after solidification of weld. Consequently, a fine oxide effectively improves strength and toughness of the entire weld metal at low temperature.

In the technology of PTL5, REM is determined to be optimum as an element having such an effect, and a specified amount of REM is contained in the similar-metal-composition welding wire to disperse an appropriate amount of fine oxides of REM in the weld metal. The REM oxides each have a property of good wettability to a melted iron alloy compared with other metal oxides, for example, Al oxides. As a result, even if the REM oxides are formed in a liquid phase of the weld metal, the oxides are less likely to agglomerate and thus do not grow into larger grains. This allows the REM oxides to be left as fine grains, and thus each of the oxides serves as the pinning grain that inhibits the crystal grain growth during or after solidification of weld. Consequently, the REM oxides effectively improve strength and toughness of the entire weld metal at low temperature.

In addition, PTL6 proposes a technology that allows a specified amount of REM to be contained in the similar-metal-composition welding wire. In the technology of PTL6, REM and Ga are added in combination, and a ratio of REM amount to Ca amount is controlled to be within a fixed range to stabilize arc in pure Ar gas.

CITATION LIST

Patent Literature

PTL1: Japanese Unexamined Patent Application Publication No. 54-76452
PTL2: Japanese Unexamined Patent Application Publication No. 53-118241
PTL3: Japanese Unexamined Patent Application Publication No. 61-15925
PTL4: Japanese Unexamined Patent Application Publication No. 2009-90312
PTL5: Japanese Unexamined Patent Application Publication No. 2009-101414
PTL6: Japanese Unexamined Patent Application Publication No. 57-171598

SUMMARY OF INVENTION

Technical Problem

As described above, welding of the storage tank for low temperature service or associated equipment thereof is desirably performed by gas shield arc welding with high working efficiency without being limited to low efficient TIG welding. Each of PTL4 and PTL5 also describes that not only the TIG welding, but also a MIG welding process (for example, a plasma MIG welding process and a coaxial multilayered wire welding process), which mainly uses an inert gas as a shield gas, is preferably used as the welding process using the similar-metal-composition welding wire for ultralow-temperature steel.

While the oxygen amount must be kept to 100 ppm or less in the weld metal of a joint formed after welding between the 9% Ni steel pieces, the MIG welding process is also suitable in light of such a need. Excessive content of oxygen in the weld metal of the joint causes an increase in number density of oxides, and/or coarsening of the oxides due to agglomeration or coalescence thereof, resulting in significant degradation in the ultralow-temperature toughness. As a result, the weld joint between 9% Ni steel pieces does not satisfy the reference value for each of the vE-196° C. measured by the instrumented Charpy impact test method and the crack-initiation resistance strength.

In the gas shield arc welding process, gas shield arc welding is typically performed using one of shield gases of pure Ar (argon) gas, Ar gas mixed with about 2 to 5% $CO_2$ (carbon dioxide), and Ar gas mixed with as much as about 20% $CO_2$ (80% Ar-20% $CO_2$ welding is in general referred to as MAG welding). Among the shield gases, however, each shield gas containing carbon dioxide provides oxygen from the carbon dioxide, which prevents decrease of oxygen amount in the weld metal. This results in an excessively large amount of oxygen in the weld metal, and consequently the certain ultralow-temperature toughness cannot be secured as described above.

Thus, pure Ar is used as the shield gas in the gas shield arc welding process in order to reduce the oxygen amount in the weld metal formed in the weld joint between 9% Ni steel pieces. When pure Ar containing no carbon dioxide is used as the shield gas in such a way, the oxygen amount in the weld metal is reduced, and the ultralow-temperature toughness is improved. On the other hand, however, this causes a new problem of deterioration in bead shape of the weld joint between 9% Ni steel pieces.

FIG. 2 illustrates an example of a flash butt weld joint between 9% Ni steel pieces while its bead shape is degraded. FIG. 2 illustrates a weld joint 1b between 9% Ni steel plates 2a and 2b formed by MIG welding, where a bead of a weld metal 4 has a greatly upwardly expanded, convex shape as illustrated in FIG. 2, and a lateral border of the weld metal 4 is connected to the surface of each of the 9% Ni steel plates 2a and 2b through discontinuous inflection points (bents), which is technically known as overlap. In the case of a fillet weld joint in which 9% Ni steel pieces are perpendicular to each other, such a poor convex bead having a greatly upwardly expanded shape also appears in a weld bead portion at a corner (L-shaped portion) of the weld joint. The poor convex bead, which appears across part or all of the weld bead portion of the weld joint, causes a reduction in the fatigue strength of the weld joint as well known, leading to a reduction in reliability of the weld joint.

In the flash butt weld joint, as well known, an excellent (normal) bead shape is an upwardly expanded convex bead as illustrated in FIG. 1, in which the bead is smooth and low in height, and the lateral border of the weld metal 4 is smoothly and continuously connected to the surface of each of the 9% Ni steel plates 2a and 2b. In addition, in the T or L-shaped weld joint, as well known, the excellent (normal) bead shape is an arcuately curved concave shape that is downwardly and sequentially dented in a weld bead portion at a corner (L-shaped portion) of the weld joint, in which a lateral border of a weld metal is also smoothly and continuously connected to the surface of each 9% Ni steel plate. In other words, in such a known, normal bead shape, the lateral border of weld metal is not connected to the surface of each 9% Ni steel plate through the discontinuous inflection points (bents). Consequently, the fatigue strength of the weld joint is not reduced, and thus reliability of the weld joint is secured.

Such a poor convex bead shape appears not only in a partial or entire section of the weld joint, but also over the entire longitudinal line of the weld bead portion of the weld joint. In other words, the normal (excellent) bead shape must be secured over the entire longitudinal line of the weld bead portion of the weld joint in order to secure the fatigue strength and reliability of the weld joint.

Hence, if such a poor convex bead appears partially or entirely, a downstream step (operation) is required to correct the bead shape into an excellent shape by polishing and cutting, as well known in welding operation. Extremely long welding time and extremely large number of portions to be welded are required for welding of the actual low temperature structure to which 9% Ni steel is applied. In light of such a circumstance, if the downstream step is required, the MIG welding is unrealistically used.

In the typical MIG welding process using the shield gas containing carbon dioxide, wettability of a bead is improved by the effect of oxygen from the carbon dioxide, resulting in an excellent bead shape. This eliminates the need of the downstream step (operation) to correct the bead shape into an excellent shape by polishing and cutting. In other words, the typical MIG welding process uses the shield gas containing carbon dioxide to secure an excellent bead shape of the weld joint.

As described above, there are two major control issues to form a practical weld joint between 9% Ni steel pieces by the MIG welding process: control for forming the excellent bead shape, which requires a certain amount of oxygen, and control for improving the ultralow-temperature toughness of the joint, which requires regulation of oxygen. In addition, such control operations are inconsistent in oxygen supply, and are therefore difficult to be achieved together.

Possibly for this reason, in each of PTL4 and PTL5, although it is described that the MIG welding process may be used for welding between 9% Ni steel pieces with the similar-metal-composition welding wire, TIG welding process, which allows stable low-temperature toughness to be secured despite its low working efficiency in welding operation, is actually used in Example thereof. In some case, MIG welding with pure Ar as a shield gas is used for welding between 9% Ni steel pieces using the similar-metal-composition welding wire to produce a flash butt weld joint between 9% Ni steel plates. In such a case, however, only the low-temperature toughness is intended to be secured as in PTL4 and PTL5. Specifically, no consideration is made on the problem of the poor convex bead, which is the problem over the entire longitudinal line (in a welding direction) of the weld bead portion of the joint, and is a matter of reliability of the joint.

On the other hand, in the technology of PTL6, MIG welding is performed with pure Ar gas as a shield gas, and REM and Ca are added in combination to stabilize arc as described above, which allows decrease of number of defects within the weld metal. The technology of PTL6, however, also makes no consideration on the problem of the poor convex bead. Ca is also an element that easily forms oxides, and is likely to cause a poor bead shape in MIG welding with pure Ar gas as a shield gas. In addition, excessive addition of Ca causes degradation in low-temperature toughness.

In addition, the poor convex bead shape may appear over the longitudinal line (in a welding direction) of the weld bead portion of the joint regardless of configurations of the joint or welding positions. Moreover, as described above, such a poor bead shape more easily appears in MIG welding with pure Ar containing no carbon dioxide as a shield gas to reduce the amount of oxygen for improving the ultralow-temperature toughness.

If such a poor convex bead appears in a large structure as a welding application of 9% Ni steel, such as the storage tank for, for example, LNG, liquid nitrogen, and liquid oxygen, or associated equipment thereof, use of the MIG welding process is seriously obstructed. In other words, such a poor bead leads to significant limitations on welding applications of 9% Ni steel. Consequently, unless the problem of the poor convex bead is solved together with the improvement in ultralow-temperature toughness of the joint, which requires regulation of oxygen, a practical weld joint between 9% Ni steel pieces cannot be formed by the MIG welding process.

An object of the invention, which is made in light of such problems, is to provide a welding solid wire that allows welding between 9% Ni steel pieces by a highly efficient gas shield arc welding process such as MIG welding, and a weld metal of a joint formed with such a welding solid wire.

Solution to Problem

To achieve the above-described object, a welding solid wire of the invention is summarized by containing, in percent by mass, C, 0.10% or less (0% is not included), Si: 0.15% or less (0% is not included), Mn: 0.1 to 0.8%, Ni: 8.0 to 15.0%, REM: 0.005 to 0.040%, and O: 0.0020 to 0.0150%, where a mass ratio [REM]/[O] of REM to O is within a range of 2.5 to 4.2, and further containing Al and Ti each being regulated to be 0.03% or less (0% is included), with the remainder consisting of Fe and inevitable impurities.

The mass ratio [REM]/[O] of REM to O is preferably within a range of 3.1 to 4.2. Moreover, the welding solid wire is preferably used for gas shield arc welding of 9% Ni steel, in which one of pure argon gas and argon gas containing less than 2% (0% is not included) carbon dioxide is used as a shield gas.

To achieve the above-described object, a weld metal of the invention is summarized by a weld metal of a weld joint between 9% Ni steel pieces, the weld metal containing, in percent by mass, C, 0.10% or less (0% is not included), Si: 0.15% or less (0% is not included), Mn: 0.1 to 0.8%, Ni: 8.0 to 15.0%, REM: 0.005 to 0.040%, and O: 0.0150% or less (0% is not included), and further containing Al and Ti each being regulated to be 0.03% or less (0% is included), with the remainder consisting of Fe and inevitable impurities, wherein when a sectional structure of the weld metal is observed by SEM of 1000 magnifications, average number of oxides having a maximum diameter of 0.1 to less than 1 μm is $1\times10^3$ to $5.0\times10^3$ per a visual field of 1 $mm^2$.

The weld metal is formed by gas shield arc welding between the 9% Ni steel pieces with a welding solid wire and a shield gas, where the welding solid wire contains, in percent by mass, C, 0.10% or less (0% is not included), Si: 0.15% or less (0% is not included), Mn: 0.1 to 0.8%, Ni: 8.0 to 15.0%, REM: 0.005 to 0.040%, and O: 0.0020 to 0.0150%, where a mass ratio [REM]/[O] of REM to O is within a range of 2.5 to 4.2, and further contains Al and Ti each being regulated to be 0.03% or less (0% is included), with the remainder consisting of Fe and inevitable impurities, and the shield gas is preferably one of pure argon gas and argon gas containing less than 2% (0% is not included) carbon dioxide.

Advantageous Effects of Invention

As described above, the present invention achieves both an excellent bead shape and high ultralow-temperature toughness of a weld joint in welding between 9% Ni steel pieces by a highly efficient MIG welding process. The invention, therefore, achieves the above-described control operations inconsistent with each other: controlling the beads of the weld joint into excellent shapes and controlling the ultralow-temperature toughness of the joint to be high. Specifically, the invention achieves the control for forming the excellent bead shape, which requires a certain amount of oxygen, together with the control for improving the ultralow-temperature toughness of the joint, which requires regulation of oxygen. The invention achieves both of the control operations inconsistent with each other, which is a novel viewpoint that has never been presented by PTL4, PTL5, and PTL6.

To achieve this, the invention minutely controls the amount of oxygen existing (contained) in the welding solid wire such that the amount is small enough to avoid degradation in ultralow-temperature toughness of the joint, but is sufficient to form fine oxides of REM in the weld metal and to control the bead shape to be excellent.

During this operation, oxygen is basically not supplied from the shield gas to the weld metal in the MIG welding process. Pure argon gas is therefore used as the shield gas in the MIG welding process used in the invention. Even if the shield gas contains carbon dioxide mixed to argon, the amount of carbon dioxide is small, less than 2%, which is greatly different from that in usual cases. Such carbon dioxide is to supply a certain amount of oxygen, the amount being sufficient to control the bead shape to be excellent, as a supplement of oxygen supplied from the welding solid wire.

In the invention, REM is added into the welding solid wire, and thus an appropriate amount of fine oxides of the REM are dispersed in the weld metal through the property of the REM oxides, i.e., the fact that REM oxides do not grow into large grains. The dispersed oxides serve as pinning grains that inhibit crystal grain growth during or after solidification of weld. This improves the strength and toughness of the weld metal at ultralow temperature.

In the technology of PTL5, as in the invention, REM is added into the welding solid wire, and an appropriate amount of fine oxides of the REM are dispersed in the weld metal to improve the strength and toughness of the weld metal at ultralow temperature. In the invention, however, unlike the technology of PTL5, a certain amount of oxygen exists (is contained) in the welding solid wire, the amount being small enough to avoid degradation in ultralow-temperature toughness of the joint, but being sufficient to form fine oxides of REM in the weld metal and to control the bead shape to be excellent, as described above. In other words, the technology of PTL5 has only the two viewpoints: a viewpoint of avoidance of degradation in ultralow-temperature toughness of the joint and a viewpoint of formation of fine oxides of REM in the weld metal. In this case, the oxygen, which should exist (be contained) in small amount in the welding solid wire, naturally decreases. This results in lack of the certain amount of oxygen, the amount being sufficient to control the bead shape to be excellent, which prevents the bead shape from being controlled to be excellent in MIG welding.

In contrast, in the invention, first, the mass ratio [REM]/[O] of REM to O in the welding solid wire is controlled to be within a particularly limited range so that a certain amount of oxygen exists (is contained) in the welding solid wire, the amount being sufficient to form the fine oxides of REM in the weld metal and to control the bead shape to be excellent as described above.

Furthermore, the invention controls the amount of oxygen to be appropriate so that the beads of the joint are made into the excellent shapes through a combination of the adding effect of certain amount of REM, the amount being determined by the mass ratio between REM and O, and control (decrease) of the amount of each of Al and Ti, as a strong deoxidizer compared with REM, to be relatively low. This prevents a reduction in fatigue strength of the weld joint, and eliminates the need of the downstream step (operation) of correcting the poor convex bead shape by polishing and cutting.

The invention aims to form an excellent bead shape of the joint without degradation in ultralow-temperature toughness of the joint even if MIG welding is performed using, for example, pure Ar, which contains an extremely small amount of oxygen compared with usual cases, as a shield gas. In this regard, as described above, the MIG welding process requires a certain amount of oxygen to form the excellent bead shape of the joint. The invention secures the certain amount of oxygen by supplying oxygen from the welding solid wire regulated in amount of each of Al and Ti as the deoxidizers. Concurrently, the invention prevents degradation in ultralow-temperature toughness by suppressing excessive supply of oxygen unlike the existing case using a shield gas containing much carbon dioxide.

In this way, the invention minutely divides a certain amount of oxygen in the welding solid wire, the amount being determined by the mass ratio between REM and O as described above, into oxygen for formation of the fine oxides of REM as the pinning grains that inhibit crystal grain growth of the weld metal, and oxygen to be supplied to make the beads of the joint into the excellent shapes.

To secure such minutely controlled oxygen amount, it is essential not only to control the mass ratio of REM to O, but also to control (reduce) the content of each of Al and Ti, as a stronger deoxidizer that readily reacts with that oxygen, to be relatively low. If the content of each of Al and Ti, which are to be essentially regulated as impurities, increases within a trace range for impurities, oxides of Al and Ti are formed, leading to consumption of oxygen. This results in lack of oxygen supply from the welding solid wire, the oxygen being required to form the fine oxides of REM, and to make the beads of the joint into excellent shapes.

Through the above minute control of the oxygen amount, on the basis that the ultralow-temperature toughness of the joint is not degraded by excessive oxygen during gas shield arc welding, the invention refines the crystal grains of the weld metal by the fine oxides of REM in the weld metal to improve the ultralow-temperature toughness of the joint, and makes the beads of the joint into the excellent shapes.

In welding solid wire examples (Nos. 5 to 10) each containing an effective amount of REM in Table 2 in Example of PTL5, one of the mass ratio [REM]/[O] of REM to O and the content of each of Al and Ti is out of the range of the invention. The technology of PTL5, therefore, is less likely to achieve the control for forming the excellent bead shape, which requires a certain amount of oxygen, together with the control for improving the ultralow-temperature toughness of the joint, which requires regulation of oxygen. For such a reason, in each of PTL4 and PTL5, TIG welding process must be actually used for welding between 9% Ni steel pieces with the similar-metal-composition welding wire in Example thereof, while it is described that MIG welding may be used for the welding.

The invention can provide a weld metal of a weld joint, the weld metal having a property of ultralow-temperature toughness substantially equal to that of a base metal, after welding of 9% Ni steel, and a similar-metal-composition welding solid wire that allows formation of such weld metal. In addition, the invention can achieve such effects while making the beads of the joint into excellent shapes to improve fatigue strength.

As the ultralow-temperature toughness, specifically, using the instrumented Charpy impact test method, a high value of more than 100 J can be provided as the absorbed energy at an ultralow temperature of $-196°$ C. (vE-196° C.) of the joint between 9% Ni steel pieces, and a high value of more than the reference value of 25000 N can be provided as the crack-initiation resistance strength (maximum load) at $-196°$ C. of the joint. This allows formation of the weld joint having an excellent ultralow-temperature property in conformity with a brittle failure phenomenon of an actual large-size welding structure together with formation of the excellent bead shape of the joint.

In addition, the similar-metal-composition welding solid wire is used in the invention, which achieves a reduction in cost compared with a case of using a high-alloy wire, and eliminates the above-described significant loads or burdens due to an increase in thickness and in weight of base steel associated with insufficient strength of the weld joint. Moreover, this accordingly leads to solution of problems in quality, such as degradation in heat crack resistance of the weld joint, and degradation in thermal fatigue characteristics due to a difference in thermal expansion coefficient. Consequently, a welding structure configured of ultralow-temperature steel is readily produced. Consequently, 9% Ni steel having an excellent low-temperature property can be further widely used for various applications.

DESCRIPTION OF EMBODIMENTS

Figure 1:
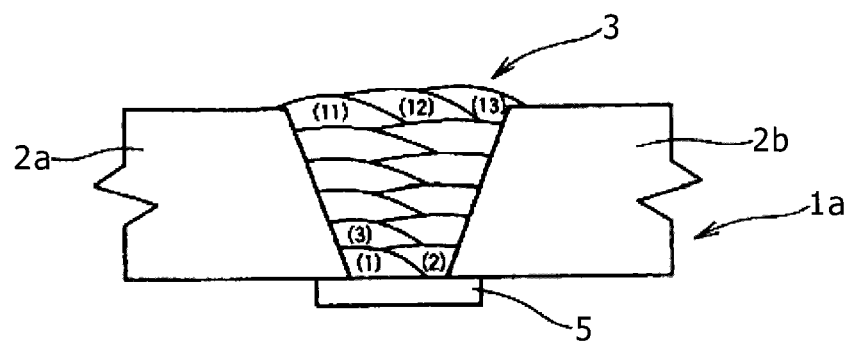
FIG. 1 is a schematic illustration of an example of a flash butt weld joint with an excellent bead shape between 9% Ni steel plates.

Description is now made on the reason for limiting the chemical composition of the welding solid wire of the invention. Although the following description is made mainly with a gas shield arc welding process such as MIG welding, it will be appreciated that the invention may be applied to a TIG welding process.

Chemical Composition of Welding Solid Wire:

The chemical composition of the similar-metal-composition welding solid wire of the invention secures high yield strength and high low-temperature toughness of each of a weld joint of 9% Ni steel and a weld metal of the weld joint. To achieve this, the welding solid wire of the invention contains, in percent by mass, C, 0.10% or less (0% is not included), Si: 0.15% or less (0% is not included), Mn: 0.1 to 0.8%, Ni: 8.0 to 15.0%, REM: 0.005 to 0.040%, and O: 0.0020 to 0.0150%, where a mass ratio [REM]/[O] of REM to O is within a range of 2.5 to 4.2, and further contains Al and Ti each being regulated to be 0.03% or less (0% is included), with the remainder consisting of Fe and inevitable impurities.

The chemical components of each of the welding solid wire and the weld metal of the invention are now described in detail. Any of elements (chemical components) other than those described below is included in the inevitable impurities. Hereinafter, any percent representing the content of each element refers to mass percent. Although description is made with properties of the weld metal of the weld joint below, the same holds true for properties of the weld joint.

C (carbon): 0.10% or less (0% is not included)

A small amount of C in the welding solid wire or the weld metal is effective for increasing tensile strength (TS) of the weld metal. Hence, an effective amount of more than 0% of C is contained, but a large amount of C, significantly degrades low-temperature toughness of the weld metal. Consequently, the content of C is specified to be up to 0.10%.

Si (silicon): 0.15% or less (0% is not included)

Si in the welding solid wire or the weld metal is effective for improvement in welding workability. Hence, an effective amount of more than 0% of Si is contained, but a large amount of Si significantly degrades low-temperature toughness of the weld metal, and significantly increases hot cracking susceptibility. Consequently, the content of Si is specified to be up to 0.15%.

Mn (manganese): 0.1 to 0.8%

Mn in the welding solid wire or the weld metal improves welding workability, and exhibits an excellent effect as a deoxidizer or sulfur scavenger, and is therefore an essential component. In the Mn content of less than 0.1%, the effect of Mn is insufficient, leading to a problem of significant degradation in welding workability. On the other hand, in the Mn content of more than 0.8%, stable residual austenite is readily formed in the weld metal, which significantly degrades low-temperature toughness of the weld metal as in the case of excessive content of Ni described below. Consequently, the content of Mn is specified to be within a range of 0.1 to 0.8%, preferably within a range of 0.1 to 0.5%.

Ni (nickel): 8.0 to 15.0%

Ni in the welding solid wire or the weld metal is an essential component for securing certain low-temperature toughness as in the case of 9% Ni steel for which the similar-metal-composition welding solid wire is to be used. The Ni content of less than 8.0% fails to add sufficient low-temperature toughness to the weld metal. On the other hand, the Ni content of more than 15.0% excessively increases mechanical strength of the weld metal, leading to a significant reduction in ductility. In addition, this causes unstable residual austenite that is transformed into martensite at ultralow temperature, leading to degradation in low-temperature toughness. Consequently, the content of Ni is specified to be within a range of 8.0 to 15.0%.

REM: 0.005 to 0.040%

REM in the welding solid wire or the weld metal is an essential and characteristic component. REM refers to Rare Earth Metal, and is a general term of elements of La to Lu in the periodic table. Any of the elements exhibits the same effect; hence, one or two elements selected from the elements of REM should be contained.

As well known, in general, most oxides significantly degrade the low-temperature toughness; hence, it is not preferable to form a large number of large oxides in the weld metal. However, oxides of REM, which are formed through reaction of REM with a small amount of oxygen contained in weld metal, finely exist in the weld metal without being coarsened. Such REM oxides each do not serve as an initiation site of fracture unlike other coarse oxides, but rather serve as pinning grains that inhibit crystal grain growth during or after solidification of weld. As a result, the REM oxides contained in the weld metal effectively improve strength and toughness of the entire weld metal.

In the invention, an appropriate amount of such fine oxides of REM is dispersed in the weld metal to improve the ultralow-temperature property of the weld metal. The reason why the REM oxides are maintained in a finely dispersed state in the weld metal unlike other oxides is because each REM oxide has a property of good wettability to a melted iron alloy compared with, for example, Al oxides. It is therefore believed that even if the oxides of REM are formed in a liquid phase of the weld metal, the oxides are less likely to agglomerate and thus do not grow into larger grains.

While such REM can be contained in the welding solid wire or the weld metal to improve the ultralow-temperature property of the weld metal, the content of REM must be maintained within an appropriate range as clear in Example described later. If the content of REM is less than 0.005%, crack-initiation resistance strength of the weld metal is low, and thus the required ultralow-temperature property is failed to be secured. On the other hand, if the content of REM is excessively large, i.e., more than 0.040%, the crack-initiation resistance strength of the weld metal is also low, and the low-temperature toughness thereof is degraded, and thus the required ultralow-temperature property is also failed to be secured. Consequently, the content of REM is specified to be within a range of 0.005 to 0.040%.

O (oxygen): 0.0020 to 0.0150%

O in the welding solid wire is indispensable for forming the fine oxides of REM in the weld metal; hence, the content of O in the welding solid wire must have a lower limit that is 0.0020% herein. Thus, the invention does not merely control or regulate the value of the content of O in the welding solid wire or the weld metal to be low unlike in the past.

An excessively large amount of O in the welding solid wire or the weld metal, however, causes an increase in number of oxides and/or coarsening thereof due to agglomeration/coalescence of the oxides, which include other metal oxides, in the weld metal, resulting in significant degradation in low-temperature toughness. Hence, the content of O in the welding solid wire or the weld metal must have an upper limit that is specified to be 0.0150% herein.

Mass Ratio [REM]/[O] of REM to O of 2.5 to 4.2

Here, a mass ratio [REM]/[O] of REM to O in the welding solid wire is important. As described before, the invention minutely divides a certain amount of oxygen in the welding solid wire, the amount being determined by the mass ratio between REM and O, into oxygen for formation of the fine oxides of REM as the pinning grains that inhibit crystal grain growth of the weld metal, and oxygen to be supplied to make the beads of the joint into the excellent shapes.

To achieve this, the mass ratio [REM]/[O] of REM to O in the welding solid wire is controlled to be within a particularly limited range of 2.5 to 4.2 so that a certain amount of oxygen exists (is contained) in the welding solid wire, the amount being sufficient to form the fine oxides of REM in the weld metal and to control the bead shape to be excellent.

If [REM]/[O] in the welding solid wire is excessively small, the content of REM is excessively low with respect to O, resulting in excessive O in the weld metal. This causes coarsening of oxides such as REM oxides or excessive formation of the oxides, leading to significant degradation in ultralow-temperature toughness. On the other hand, If the [REM]/[O] in the welding solid wire is excessively large, the content of REM is excessively high with respect to O. This prevents certain amount of oxygen from being supplied to the weld metal, the amount being sufficient to control the bead shape to be excellent, leading to the poor convex bead shape. Consequently, the mass ratio [REM]/[O] of REM to O is specified to be within a range of 2.5 to 4.2, preferably within a range of 3.1 to 4.2.

Al: 0.03% or less (0% is included), Ti: 0.03% or less (0% is included)

As described before, the invention controls the amount of oxygen to be appropriate so that the beads of the joint are made into the excellent shapes through a combination of the adding effect of certain amount of REM, the amount being determined by the mass ratio between REM and O, and control (decrease) of the amount of each of Al and Ti, as a strong deoxidizer compared with REM, to be relatively low. Consequently, even if MIG welding is performed using, for example, pure Ar, which contains an extremely small amount of oxygen compared with usual cases, as a shield gas, an excellent bead shape of the joint can be formed without degradation in ultralow-temperature toughness of the joint. The MIG welding process requires a certain amount of oxygen to form the excellent bead shape of the joint. The invention secures the certain amount of oxygen by supplying oxygen from the welding solid wire regulated in amount of each of Al and Ti as the deoxidizers. This prevents a reduction in fatigue strength of the weld joint, and eliminates the need of the downstream step (operation) for correcting the poor convex bead shape by polishing and cutting. Concurrently, the invention prevents degradation in ultralow-temperature toughness by suppressing excessive supply of oxygen unlike the existing case using a shield gas containing much carbon dioxide.

To achieve this, the contents of such deoxidizers are collectively controlled to be as low as possible within a range of each of Al and Ti of up to 0.03% including 0% at which each element is not contained. If the content of each of Al and Ti exceeds the upper limit, oxides of Al and/or Ti increase, and thus, even if the content of each of O and REM and the mass ratio are appropriate, the content of O is insufficient in the weld metal. This prevents certain amount of oxygen from being supplied to the weld metal, the amount being sufficient to control the bead shape to be excellent, leading to the poor convex bead shape. Moreover, the coarse oxides of Al and/or Ti significantly degrade the ultralow-temperature toughness.

Hence, the invention is greatly different in the thinking way on Al and Ti from existing technology where Al is contained as a deoxidizer for preventing weld defects such as blowholes, and titanium is also contained together as an element having the same effects as those of REM forming the fine oxides.

Other Elements:

In other elements, for example, Ca (calcium), Cr (chromium), Mg (magnesium), P (phosphorus), S (sulfur), and B (boron) are harmful impurities in securing certain ultralow-temperature toughness in the case where the welding solid wire having the above-described composition is used. Hence, such elements are reduced as much as possible within an economically possible range for inevitable impurities in a usual steel manufacture process.

Number of Oxides:

In the invention, as described before, an appropriate amount of fine oxides of REM is dispersed in the weld metal of the weld joint between 9% Ni steel pieces to improve the ultralow-temperature property of the weld metal. The dispersion of an appropriate amount of fine oxides of REM in the weld metal is specifically defined as follows: when a sectional structure of the weld metal is observed by SEM of 1000 magnifications, the average number of oxides having a maximum diameter of 0.1 to less than 1 μm is $1 \times 10^3$ to $5.0 \times 10^3$ per a visual field of 1 mm$^2$.

Here, the oxides are defined for any type of oxides, i.e., not only for oxides of REM but also for all oxides in the weld metal. The oxides in the weld metal naturally include not only the oxides of REM but also other metal oxides. In measurement of the average number of the oxides, however, it is complicated to determine a type of each oxide to selectively count only the fine oxides of REM. Moreover, even if all the oxides, including those other than the REM oxides, are counted, a correlation between the REM oxides in the weld metal and the low-temperature toughness characteristics is not significantly disturbed. Hence, selective count of the fine oxides of REM is not significantly useful despite much effort. Hence, in the invention, not only the REM oxides but also all oxides are defined to be measured for determination of the average number. As described later, therefore, when the average number of the fine oxides is determined by SEM, whether or not an object is an oxide is identified using, for example, EDX (Energy Dispersive Spectrometry), and size of each oxide is determined regardless of a type of the oxide.

The average number of oxides of less than $1 \times 10^3$ per a visual field of 1 mm$^2$ leads to insufficient number of fine oxides of REM as the pinning grains that inhibit crystal grain growth during or after solidification of weld. This results in a reduction in crack-initiation resistance strength of the weld metal, leading to degradation in low-temperature toughness thereof. On the other hand, the average number of oxides of more than $5 \times 10^3$ per a visual field of 1 mm$^2$ also results in a reduction in crack-initiation resistance strength of the weld metal. This leads to degradation in low-temperature toughness of the weld metal, and consequently the required ultralow-temperature property is not sufficiently achieved. Consequently, the average number of oxides having a maximum diameter of 0.1 to less than 1 μm is specified to be within the above-described range.

Manufacturing of Welding Solid Wire:

The welding solid wire of the invention described hereinbefore is manufactured as follows: a similar-metal-composition steel wire rod having the above-described composition is drawn to a welding solid wire having a production diameter (small diameter of 0.8 to 1.6 mm) in a known drawing step using a wire drawing bench with a roller die or a hole die.

The welding solid wire is manufactured in this way, and is then conveyed in an accommodation style of being wound on a spool or being loaded on a pail pack for welding. In more general, in a welding operation site of the low temperature structure of 9% Ni steel, such an accommodated welding solid wire is drawn out from the spool (or pail pack) by a feed roller of a feeder, and is fed to a power supply tip in a torch for MIG welding at a welding position through a liner or the like enveloped by a continuous conduit cable (flexible guide tube).

During a series of such feed operation of the welding wire, the surface of the welding solid wire may be subjected to copper plating or application of a lubricant or rust inhibitor oil in order to stably secure certain feed performance of the welding solid wire such that the wire is stably fed at a fixed speed regardless of feed conditions. Such copper plating or a lubricant has an effect of reducing feed resistance of the feed liner to improve the feed performance of the wire, which extremely improves the drawing performance, and has an effect of improving current supply and rust inhibition.

On the other hand, a naked welding solid wire, the surface of which is not subjected to any of copper plating and application of a lubricant or rust inhibitor oil, may be used in consideration of environmental issues associated with such treatment of copper plating or application of a lubricant or rust inhibitor oil onto the surface of the welding solid wire.

In addition, not only a single solid wire consisting of only a common similar-metal-composition wire but also a wire having a known coaxial multilayered wire structure may be used as the welding solid wire of the invention.

Welding Method:

In the invention, although MIG welding is shown as a main welding method, the welding method is defined to be the above-described gas shield arc welding process in a broad sense. This is because MIG welding is defined as "Metal Inert Gas welding", i.e., welding with an inert gas (Ar) as a shield gas, which strictly means welding with 100% Ar (pure argon gas) as a shield gas. In contrast, as described above, the scope of the invention includes not only a case using pure argon gas, but also a case using a shield gas including Ar mixed with a small amount of, i.e., less than 2% (0% is not included), carbon dioxide. Whether or not such a case is involved in MIG welding is a sensitive issue in light of the above definition. Thus, the welding method to be used in the invention is defined as "gas shield arc welding" that is broader in sense than "MIG welding" in order to definitely involve the case using the shield gas containing a small amount of carbon dioxide.

In the invention, as described above, oxygen is basically not supplied from the shield gas to the weld metal of the joint between 9% Ni steel pieces. Pure Ar (argon) gas is therefore basically used as the welding shield gas for use in welding operation using the welding solid wire of the invention, and in formation of the weld metal of the invention. Even if the shield gas contains carbon dioxide mixed to argon, the amount of carbon dioxide is small, less than 2%, which is greatly different from that in usual cases. Such carbon dioxide is to supply a certain amount of oxygen, the amount being sufficient to control the bead shape to be excellent, as a supplement of oxygen supplied from the welding solid wire. When a shield gas including Ar gas and a certain amount of $CO_2$ (carbon dioxide) mixed thereto, the amount being typically about 2 to 3% or as much as about 20% in some cases, is used as in the existing MIG welding or gas shield arc welding, the oxygen amount in the weld metal cannot be reduced due to oxygen from the carbon dioxide in the shield gas. This results in an excessively large amount of oxygen in the weld metal, and thus the ultralow-temperature toughness is failed to be secured as described before.

In operation of such gas shield arc welding, various (known) methods, conditions, apparatuses, and/or jigs may be used for improving efficiency and/or stabilizing arc in correspondence to (depending on) a joint configuration and/or a welding position (flat or horizontal position). In other words, it is an advantage of the invention that such typical methods, conditions, apparatuses, and/or jigs for the gas shield arc welding can be used without any modification. For example, a known plasma MIG welding process using a combination of a MIG welding power supply and a plasma welding power supply, or the above-described coaxial multilayered wire welding process may be used.

9% Ni steel:

A configuration of the 9% Ni steel as the ultralow-temperature steel, which is to be welded using the welding solid wire of the invention, is selected from various configurations such as a steel plate, mold steel, and a steel bar in correspondence to (depending on) various joint configurations or regions to be welded of the low temperature structure. While Al and Ti in the welding solid wire are regulated for minute control of the oxygen as described before, Al and Ti in the 9% Ni steel base metal are also the deoxidizers, and are thus likely to disturb the oxygen control in the weld bead portion. The content of each of Al and Ti is, therefore, preferably regulated to be 0.05% or less (0% is included) even in the 9% Ni steel base metal. Since the Al and Ti are mixed in from the base metal in a diluted manner rather than directly, the content of each of Al and Ti may be slightly higher in the base metal than in the welding solid wire.

EXAMPLES

Ends of 9% Ni steel plates having the same chemical composition shown in Table 4 were subjected to edge preparation into a 45° groove as illustrated in FIG. 1, and were then subjected to flash butt MIG welding to produce joints between the 9% Ni steel pieces. The weld metals (beads) of such produced joints were each subjected to analysis of a chemical composition and measurement of the number of oxides, and ultralow-temperature toughness of each joint was measured and evaluated. Table 2 shows results of them.

With the welding solid wire, welding solid wires having various chemical compositions, each being a typical single composition, shown in Table 1 were used for the flash butt welding under welding conditions shown in Table 3. The welding operations were in common performed using a gas shield arc welder with an automatic arc controller in a flat welding position. The length (in a plate width direction) of the weld bead portion of each weld joint was fixed to 300 mm, and a backing metal 5 was provided along the length as illustrated in FIG. 1.

Analysis of Weld Metal:

The chemical composition of each of weld metals of the produced weld joints were analyzed by known fluorescent X-ray analysis as in the chemical composition analysis of the steel. In the case where a chemical composition of a welding solid wire shown in Table 1 contains impurities such as Ca, Cr, Mg, P, and S, the corresponding weld metal contains the same impurities, of which the respective amounts are substantially the same as those in the welding solid wire, without a significant fluctuation in content, which is however not shown in Table 2.

Furthermore, a sectional structure of each weld metal was observed in ten visual fields, each including a region of 0.0048 mm$^2$, by a field emission scanning electron microscope (Supra 35 from Carl Zeiss) of 1000 magnifications to determine the average number of oxides having a maximum diameter of 0.1 to less than 1 µm. The maximum diameter of the oxide refers to the largest length of the oxide (a circle-equivalent diameter having a diameter being the largest length), and the average number of oxides having the maximum diameter is obtained per a visual field of 1 mm$^2$. During the observation by SEM, elemental analysis (element content analysis) of each crystallized/precipitated product is performed by, for example, EDX (Energy Dispersive Spectrometry) to determine whether or not the product is an oxide regardless of a type of the oxide (all oxides in the range of the maximum diameter are counted).

Evaluation of Bead Shape:

After welding, the bead shape of the weld metal was evaluated in two steps over the entire length (the length of 300 mm in the plate width direction) of the weld bead portion of the weld joint. Specifically, when a weld metal having an excellent bead shape was formed without grinder processing at every pass, such a case was evaluated as ○. Alternatively, when a weld metal having an excellent bead shape was failed to be formed without grinder processing at every pass, such a case was evaluated as x.

Figure 2:
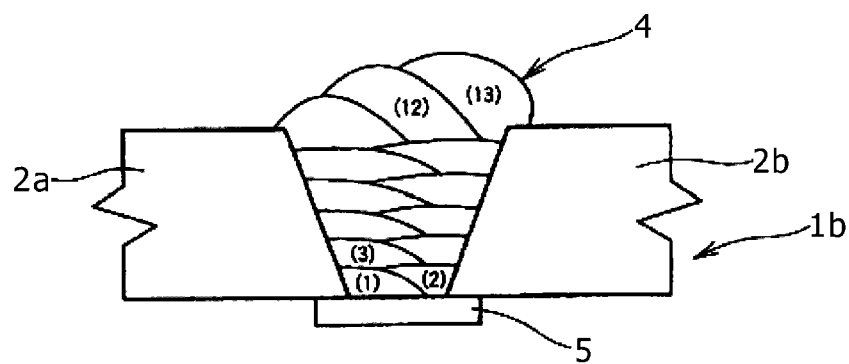
FIG. 2 is a schematic illustration of an example of a flash butt weld joint with a poor bead shape between 9% Ni steel plates.

As described before, the excellent (normal) bead shape is an upwardly expanded convex bead as illustrated in FIG. 1, in which the bead is smooth and low in height, and the lateral border of the bead is smoothly and continuously connected to each 9% Ni steel surface. The above-described poor convex shape is a greatly upwardly expanded, convex bead as illustrated in FIG. 2, in which a lateral border of the bead is connected to each 9% Ni steel surface through discontinuous inflection points (bents).

Ultralow-Temperature Toughness of Weld Joint:

The ultralow-temperature toughness of each of the produced weld joints was determined by the instrumented Charpy impact test method.

The above-described load displacement curve, which represents a relationship between a load applied to a test piece by a hammer and displacement after contact of the impact blade to the test piece, can be obtained through the instrumented Charpy impact test. According to the test method, therefore, dynamic absorbed energy (J) from the start to the end of crack initiation during application of external force, and the maximum load (a load value at a peak of the curve) can be measured instead of static absorbed energy as measured by a typical Charpy impact tester. The maximum load corresponds to a load required from the start of the impact test (a point where each of a load and displacement is zero) to crack initiation at the impact test, meaning that as the value of the maximum load increases, strength required for crack initiation, i.e., crack-initiation resistance strength is higher.

The ultralow-temperature toughness of each joint was measured as follows: Charpy impact test pieces according to JIS-Z-3112 No. 4 were produced from the produced joints, and the ultralow-temperature toughness of each test piece was measured at a temperature of −196° C. using the instrumented Charpy impact tester with maximum weighing capacity of 300 J, model: CAI-300D, from JT TOHSI INC.

In addition, the proportion of area of a brittle portion in a fractured section (fracture surface) of a test piece subjected to the Charpy impact test was obtained as percent brittle fracture surface (%).

As described before, 100 J is the reference value for the absorbed energy at an ultralow temperature of −196° C. (vE-196° C.), and 25000 N is the reference value for the crack-initiation resistance strength (maximum load) at −196° C. Consequently, when the vE-196° C. and the crack-initiation resistance strength of a joint are obtained as a result of the instrumented Charpy impact test, and when the obtained values are each large, i.e., more than the reference value, the joint has excellent ultralow-temperature toughness.

As shown in Table 2, in each of Examples of the invention, in which the chemical composition of the welding solid wire in Table 1 satisfies the range of the invention, MIG welding is performed at a preferred shield gas condition of no oxygen (carbon dioxide) or extremely low oxygen (carbon dioxide) concentration. As a result, the chemical composition and the structure of each relevant weld metal in Table 2 satisfy the respective specified ranges. In addition, the weld metal has excellent ultralow-temperature toughness in that the absorbed energy at an ultralow temperature of −196° C. (vE-196° C.) exceeds the reference value of 100 J, and the crack-initiation resistance strength (maximum load) at −196° C. exceeds the reference value of 25000 N.

In addition, each Example of the invention has such excellent ultralow-temperature toughness together with an excellent (normal) bead shape as shown in Table 2. This means that each Example of the invention achieves the control for forming the excellent bead shape, which requires a certain amount of oxygen, together with the control for improving the ultralow-temperature toughness of the joint, which requires regulation of oxygen, though the two types of control are in general difficult to be achieved together. It is therefore revealed that the invention opens the way for practical application of formation of the weld joint between 9% Ni steel pieces by gas shield arc such as MIG welding.

In contrast, comparative examples 17 and 18 in Table 2 use welding wires 1 and 2, respectively, which satisfy the chemical composition range of the invention in Table 1. In each comparative example, however, oxygen (carbon dioxide) concentration in a shield gas condition is excessively high as shown in Table 3. As a result, as shown in Table 2, although an excellent bead shape is produced, the vE-196° C. and the crack-initiation resistance strength (maximum load) are each lower than the reference value.

Comparative examples 19 to 30 in Table 2 use welding wires 15 to 26, respectively, each having a chemical composition that does not satisfy the range of the invention as shown in Table 1.

The comparative example 19 has an excessively large amount of C (welding wire 15 in Table 1).

The comparative example 20 has an excessively large amount of Si (welding wire 16 in Table 1).

The comparative example 21 has an excessively small amount of Mn (welding wire 17 in Table 1).

The comparative example 22 has an excessively large amount of Mn (welding wire 18 in Table 1).

The comparative example 23 has an excessively small amount of Ni (welding wire 19 in Table 1).

The comparative example 24 has an excessively large amount of Ni (welding wire 20 in Table 1).

The comparative example 25 has an excessively small amount of REM (welding wire 21 in Table 1).

The comparative example 26 has an excessively large amount of REM (welding wire 22 in Table 1).

The comparative example 27 has an excessively large amount of O (welding wire 23 in Table 1).

The comparative example 28 has an excessively high [REM]/[O] (welding wire 24 in Table 1).

The comparative example 29 has an excessively large amount of Al (welding wire 25 in Table 1).

The comparative example 30 has an excessively large amount of Ti (welding wire 26 in Table 1).

As a result, in each of the comparative examples 19 to 30 in Table 2, MIG welding is performed at a preferred shield gas condition of no oxygen (carbon dioxide) or extremely low oxygen (carbon dioxide) concentration, but the vE-196° C. and/or the crack-initiation resistance strength (maximum load) is lower than the reference value as shown in Table 2.

The above Examples reveal that, in welding of 9% Ni steel, a weld joint and a weld metal, each having substantially the same ultralow-temperature toughness property as that of the 9% Ni steel base metal, are achieved through the chemical composition range of the welding solid wire specified in the invention, and the preferred low-oxygen condition of the shield gas for MIG welding. In addition, it is also revealed that such effects may be achieved while the bead shape of the joint is made excellent to improve fatigue strength.

TABLE 1

Composition of welding wire (mass %, the remainder is Fe)

| No. | Category | C | Si | Mn | Ni | REM Ce | REM La | REM Total | O | REM/O | Al | Ti | Cr | Ca | Mg | P | S | N |
|---|---|---|---|---|---|---|---|---|---|---|---|---|---|---|---|---|---|---|
| 1 | Example of invention | 0.032 | 0.09 | 0.40 | 10.9 | 0.020 | 0.013 | 0.033 | 0.0100 | 3.3 | — | 0.002 | — | — | — | 0.005 | 0.0026 | 0.0023 |
| 2 | | 0.025 | 0.07 | 0.41 | 11.0 | 0.006 | 0.004 | 0.010 | 0.0025 | 4.0 | 0.002 | — | — | — | — | 0.004 | 0.0024 | 0.0014 |
| 3 | | 0.087 | 0.09 | 0.40 | 10.9 | 0.019 | 0.012 | 0.031 | 0.0093 | 3.3 | 0.002 | 0.002 | — | — | — | 0.005 | 0.0020 | 0.0020 |

TABLE 1-continued

| | | Composition of welding wire (mass %, the remainder is Fe) | | | | | | | | | | | | | | | |
|---|---|---|---|---|---|---|---|---|---|---|---|---|---|---|---|---|---|
| | | | | | | REM | | | | | | | | | | | |
| No. | Category | C | Si | Mn | Ni | Ce | La | Total | O | REM/O | Al | Ti | Cr | Ca | Mg | P | S | N |
| 4 | | 0.027 | 0.15 | 0.42 | 11.2 | 0.006 | 0.004 | 0.010 | 0.0030 | 3.3 | 0.002 | — | — | — | — | 0.004 | 0.0023 | 0.0016 |
| 5 | | 0.028 | 0.09 | 0.10 | 11.0 | 0.020 | 0.013 | 0.033 | 0.0098 | 3.4 | 0.002 | 0.002 | — | — | — | 0.003 | 0.0016 | 0.0023 |
| 6 | | 0.030 | 0.09 | 0.80 | 11.0 | 0.019 | 0.012 | 0.031 | 0.0093 | 3.3 | 0.002 | 0.002 | — | — | — | 0.004 | 0.0022 | 0.0016 |
| 7 | | 0.026 | 0.09 | 0.41 | 8.4 | 0.020 | 0.013 | 0.033 | 0.0098 | 3.4 | 0.002 | 0.002 | — | — | — | 0.005 | 0.0024 | 0.0023 |
| 8 | | 0.032 | 0.09 | 0.40 | 15.0 | 0.021 | 0.013 | 0.034 | 0.0103 | 3.3 | 0.002 | 0.002 | — | — | — | 0.005 | 0.0024 | 0.0015 |
| 9 | | 0.024 | 0.09 | 0.42 | 11.0 | 0.006 | 0.002 | 0.008 | 0.0025 | 3.2 | 0.002 | 0.002 | — | — | — | 0.005 | 0.0018 | 0.0019 |
| 10 | | 0.025 | 0.09 | 0.40 | 10.9 | 0.025 | 0.015 | 0.040 | 0.0120 | 4.0 | 0.002 | 0.002 | — | — | — | 0.005 | 0.0025 | 0.0023 |
| 11 | | 0.032 | 0.09 | 0.26 | 10.9 | 0.018 | 0.012 | 0.030 | 0.0098 | 3.1 | — | — | — | — | — | 0.003 | 0.0016 | 0.0020 |
| 12 | | 0.029 | 0.09 | 0.39 | 9.1 | 0.020 | 0.013 | 0.033 | 0.0078 | 4.2 | — | — | — | — | — | 0.002 | 0.0015 | 0.0014 |
| 13 | | 0.025 | 0.09 | 0.40 | 12.0 | 0.021 | 0.013 | 0.034 | 0.0102 | 3.3 | 0.02 | 0.002 | — | — | — | 0.005 | 0.0024 | 0.0022 |
| 14 | | 0.027 | 0.09 | 0.41 | 10.9 | 0.021 | 0.013 | 0.034 | 0.0100 | 3.4 | 0.002 | 0.03 | — | — | — | 0.004 | 0.0021 | 0.0014 |
| 15 | Comparative | 0.130 | 0.09 | 0.38 | 10.9 | 0.019 | 0.013 | 0.032 | 0.0105 | 3.0 | 0.002 | 0.002 | — | — | — | 0.005 | 0.0025 | 0.0022 |
| 16 | example | 0.030 | 0.18 | 0.40 | 11.0 | 0.021 | 0.013 | 0.034 | 0.0101 | 3.4 | 0.002 | 0.002 | — | — | — | 0.005 | 0.0021 | 0.0019 |
| 17 | | 0.029 | 0.09 | 0.04 | 10.9 | 0.022 | 0.012 | 0.034 | 0.0097 | 3.5 | 0.002 | 0.002 | — | — | — | 0.005 | 0.0016 | 0.0021 |
| 18 | | 0.030 | 0.09 | 0.87 | 10.9 | 0.020 | 0.013 | 0.033 | 0.0100 | 3.3 | 0.002 | 0.002 | — | — | — | 0.003 | 0.0018 | 0.0021 |
| 19 | | 0.031 | 0.09 | 0.42 | 7.4 | 0.020 | 0.012 | 0.032 | 0.0092 | 3.5 | 0.002 | 0.002 | — | — | — | 0.005 | 0.0021 | 0.0017 |
| 20 | | 0.032 | 0.09 | 0.41 | 15.6 | 0.021 | 0.013 | 0.034 | 0.0096 | 3.5 | 0.002 | 0.002 | — | — | — | 0.005 | 0.0024 | 0.0902 |
| 21 | | 0.035 | 0.09 | 0.40 | 10.9 | 0.002 | 0.001 | 0.003 | 0.0010 | 3.0 | 0.002 | 0.002 | — | — | — | 0.003 | 0.0016 | 0.0018 |
| 22 | | 0.028 | 0.09 | 0.39 | 10.9 | 0.034 | 0.016 | 0.050 | 0.0130 | 3.8 | 0.002 | 0.002 | — | — | — | 0.005 | 0.0023 | 0.0020 |
| 23 | | 0.030 | 0.09 | 0.38 | 11.0 | 0.025 | 0.014 | 0.039 | 0.0165 | 2.4 | 0.002 | 0.002 | — | — | — | 0.005 | 0.0025 | 0.0015 |
| 24 | | 0.033 | 0.09 | 0.42 | 10.9 | 0.019 | 0.013 | 0.032 | 0.0070 | 4.6 | 0.002 | 0.002 | — | — | — | 0.005 | 0.0021 | 0.0024 |
| 25 | | 0.029 | 0.09 | 0.40 | 10.9 | 0.021 | 0.014 | 0.035 | 0.0105 | 3.3 | 0.04 | 0.002 | — | — | — | 0.004 | 0.0020 | 0.0021 |
| 26 | | 0.028 | 0.09 | 0.41 | 10.9 | 0.020 | 0.013 | 0.033 | 0.0103 | 3.2 | 0.002 | 0.04 | — | — | — | 0.005 | 0.0022 | 0.0014 |

TABLE 2

| | Wire No. in | | Composition of weld metal (mass %, the remainder is Fe) | | | | | | | | | | Number of oxides in weld metal |
|---|---|---|---|---|---|---|---|---|---|---|---|---|---|
| | | | | | | | | REM | | | | | |
| No. | Table 1 | Category | C | Si | Mn | Ni | Ce | La | Total | O | Al | Ti | $\times 10^3/mm^2$ |
| 1 | 1 | Example of | 0.025 | 0.05 | 0.41 | 10.8 | 0.010 | 0.006 | 0.016 | 0.0055 | 0.002 | 0.002 | 1.24 |
| 2 | 1 | invention | 0.024 | 0.06 | 0.40 | 10.8 | 0.009 | 0.005 | 0.014 | 0.0082 | 0.002 | 0.002 | 1.33 |
| 3 | 2 | | 0.020 | 0.03 | 0.42 | 10.9 | 0.005 | 0.002 | 0.007 | 0.0075 | 0.002 | — | 1.22 |
| 4 | 2 | | 0.021 | 0.03 | 0.38 | 10.9 | 0.004 | 0.002 | 0.006 | 0.0120 | 0.002 | — | 1.85 |
| 5 | 3 | | 0.08 | 0.06 | 0.40 | 10.8 | 0.012 | 0.005 | 0.017 | 0.0045 | 0.002 | 0.002 | 1.14 |
| 6 | 4 | | 0.024 | 0.12 | 0.41 | 11.0 | 0.005 | 0.003 | 0.008 | 0.0045 | 0.002 | — | 1.00 |
| 7 | 5 | | 0.025 | 0.05 | 0.10 | 10.9 | 0.012 | 0.008 | 0.020 | 0.0073 | 0.002 | 0.002 | 1.46 |
| 8 | 6 | | 0.028 | 0.06 | 0.80 | 10.9 | 0.015 | 0.010 | 0.025 | 0.0082 | 0.002 | 0.002 | 1.24 |
| 9 | 7 | | 0.024 | 0.07 | 0.40 | 8.0 | 0.011 | 0.007 | 0.018 | 0.0056 | 0.002 | 0.002 | 1.44 |
| 10 | 8 | | 0.030 | 0.05 | 0.39 | 14.9 | 0.010 | 0.006 | 0.016 | 0.0052 | 0.002 | 0.002 | 1.32 |
| 11 | 9 | | 0.022 | 0.06 | 0.40 | 10.9 | 0.004 | 0.001 | 0.005 | 0.0080 | 0.002 | 0.002 | 2.05 |
| 12 | 10 | | 0.023 | 0.05 | 0.40 | 10.9 | 0.020 | 0.012 | 0.032 | 0.0045 | 0.002 | 0.002 | 1.18 |
| 13 | 11 | | 0.028 | 0.06 | 0.25 | 10.8 | 0.010 | 0.005 | 0.015 | 0.0054 | 0.002 | 0.002 | 1.23 |
| 14 | 12 | | 0.025 | 0.06 | 0.37 | 9.2 | 0.010 | 0.006 | 0.016 | 0.0042 | 0.002 | 0.002 | 1.23 |
| 15 | 13 | | 0.022 | 0.05 | 0.38 | 11.9 | 0.013 | 0.006 | 0.019 | 0.0045 | 0.03 | 0.002 | 1.56 |
| 16 | 14 | | 0.024 | 0.06 | 0.40 | 10.8 | 0.013 | 0.005 | 0.018 | 0.0050 | 0.002 | 0.03 | 1.57 |
| 17 | 1 | Comparative | 0.020 | 0.03 | 0.35 | 11.0 | 0.008 | 0.003 | 0.011 | 0.0240 | 0.002 | 0.002 | 5.12 |
| 18 | 2 | example | 0.018 | 0.02 | 0.38 | 10.9 | 0.002 | 0.001 | 0.003 | 0.0450 | 0.002 | — | 5.67 |
| 19 | 15 | | 0.12 | 0.08 | 0.36 | 10.8 | 0.012 | 0.007 | 0.019 | 0.0045 | 0.002 | 0.002 | 1.25 |
| 20 | 16 | | 0.024 | 0.16 | 0.39 | 10.9 | 0.013 | 0.006 | 0.019 | 0.0053 | 0.002 | 0.002 | 1.15 |
| 21 | 17 | | 0.025 | 0.06 | 0.04 | 10.9 | 0.009 | 0.004 | 0.013 | 0.0050 | 0.002 | 0.002 | 1.35 |
| 22 | 18 | | 0.028 | 0.06 | 0.85 | 10.9 | 0.013 | 0.007 | 0.020 | 0.0045 | 0.002 | 0.002 | 1.23 |
| 23 | 19 | | 0.025 | 0.07 | 0.39 | 7.4 | 0.012 | 0.007 | 0.019 | 0.0052 | 0.002 | 0.002 | 1.26 |
| 24 | 20 | | 0.026 | 0.06 | 0.40 | 15.5 | 0.012 | 0.006 | 0.018 | 0.0049 | 0.002 | 0.002 | 1.12 |
| 25 | 21 | | 0.030 | 0.06 | 0.36 | 10.8 | 0.001 | 0.001 | 0.002 | 0.0043 | 0.002 | 0.002 | 0.35 |
| 26 | 22 | | 0.026 | 0.06 | 0.38 | 10.8 | 0.022 | 0.014 | 0.036 | 0.0065 | 0.002 | 0.002 | 1.20 |
| 27 | 23 | | 0.025 | 0.06 | 0.36 | 10.9 | 0.012 | 0.005 | 0.017 | 0.0250 | 0.002 | 0.002 | 5.32 |
| 28 | 24 | | 0.030 | 0.07 | 0.40 | 10.9 | 0.010 | 0.007 | 0.017 | 0.0045 | 0.002 | 0.002 | 1.12 |
| 29 | 25 | | 0.025 | 0.06 | 0.38 | 10.9 | 0.010 | 0.006 | 0.016 | 0.0024 | 0.04 | 0.002 | 1.37 |
| 30 | 26 | | 0.025 | 0.06 | 0.39 | 10.8 | 0.010 | 0.006 | 0.016 | 0.0030 | 0.002 | 0.04 | 1.37 |

| No. | Wire No. in Table 1 | Category | Evaluation of bead shape | vE-196(J) Et | Maximum load (N) | Percent brittle fracture (%) | Overall evaluation |
|---|---|---|---|---|---|---|---|
| 1 | 1 | Example of invention | ◯ | 149 | 25324 | 17 | ◯ |
| 2 | 1 | | ◯ | 124 | 25103 | 20 | ◯ |

TABLE 2-continued

| No. | Wire No. in Table 1 | Category | | | | |
|---|---|---|---|---|---|---|
| 3 | 2 | | ○ | 134 | 25674 | 14 | ○ |
| 4 | 2 | | ○ | 104 | 25054 | 22 | ○ |
| 5 | 3 | | ○ | 142 | 25255 | 10 | ○ |
| 6 | 4 | | ○ | 135 | 25624 | 13 | ○ |
| 7 | 5 | | ○ | 144 | 25348 | 15 | ○ |
| 8 | 6 | | ○ | 110 | 25236 | 20 | ○ |
| 9 | 7 | | ○ | 147 | 25873 | 10 | ○ |
| 10 | 8 | | ○ | 125 | 26453 | 12 | ○ |
| 11 | 9 | | ○ | 135 | 25345 | 10 | ○ |
| 12 | 10 | | ○ | 146 | 25741 | 5 | ○ |
| 13 | 11 | | ○ | 140 | 25782 | 10 | ○ |
| 14 | 12 | | ○ | 136 | 25439 | 13 | ○ |
| 15 | 13 | | ○ | 134 | 25890 | 12 | ○ |
| 16 | 14 | | ○ | 145 | 25375 | 15 | ○ |
| 17 | 1 | Comparative | ○ | 95 | 23458 | 35 | X |
| 18 | 2 | example | ○ | 54 | 20450 | 50 | X |
| 19 | 15 | | ○ | 32 | 23400 | 82 | X |
| 20 | 16 | | ○ | 45 | 24561 | 64 | X |
| 21 | 17 | | ○ | 94 | 23459 | 30 | X |
| 22 | 18 | | ○ | 98 | 24586 | 26 | X |
| 23 | 19 | | ○ | 90 | 23561 | 30 | X |
| 24 | 20 | | ○ | 93 | 23194 | 28 | X |
| 25 | 21 | | X | 123 | 22456 | 15 | X |
| 26 | 22 | | ○ | 92 | 23410 | 30 | X |
| 27 | 23 | | ○ | 88 | 22371 | 40 | X |
| 28 | 24 | | X | 112 | 25348 | 15 | X |
| 29 | 25 | | X | 97 | 24351 | 22 | X |
| 30 | 26 | | X | 105 | 24333 | 15 | X |

TABLE 3

| No. | Wire No. in Table 1 | Category | Welding method | Thickness (mm) | Shield gas Inner | Shield gas Outer | Current (A) | Voltage (V) | Speed (cm/min) | Heat input (KJ/cm) |
|---|---|---|---|---|---|---|---|---|---|---|
| 1 | 1 | Example of invention | MIG | 16 | Ar | Ar | 250 | 30 | 30 | 15.0 |
| 2 | 1 | | MIG | 16 | Ar + 0.1% $CO_2$ | Ar | 250 | 30 | 30 | 15.0 |
| 3 | 2 | | MIG | 16 | Ar + 0.4% $CO_2$ | Ar | 250 | 30 | 30 | 15.0 |
| 4 | 2 | | MIG | 16 | Ar + 1.0% $CO_2$ | Ar | 250 | 30 | 30 | 15.0 |
| 5 | 3 | | MIG | 16 | Ar | Ar | 250 | 30 | 30 | 15.0 |
| 6 | 4 | | MIG | 16 | Ar + 0.4% $CO_2$ | Ar | 250 | 30 | 30 | 15.0 |
| 7 | 5 | | MIG | 16 | Ar | Ar | 250 | 30 | 30 | 15.0 |
| 8 | 6 | | MIG | 16 | Ar + 0.1% $CO_2$ | Ar | 250 | 30 | 30 | 15.0 |
| 9 | 7 | | MIG | 16 | Ar | Ar | 250 | 30 | 30 | 15.0 |
| 10 | 8 | | MIG | 16 | Ar | Ar | 250 | 30 | 30 | 15.0 |
| 11 | 9 | | MIG | 16 | Ar + 0.4% $CO_2$ | Ar | 250 | 30 | 30 | 15.0 |
| 12 | 10 | | MIG | 16 | Ar | Ar | 250 | 30 | 30 | 15.0 |
| 13 | 11 | | MIG | 16 | Ar | Ar | 250 | 30 | 30 | 15.0 |
| 14 | 12 | | MIG | 16 | Ar | Ar | 250 | 30 | 30 | 15.0 |
| 15 | 13 | | MIG | 16 | Ar + 0.1% $CO_2$ | Ar | 250 | 30 | 30 | 15.0 |
| 16 | 14 | | MIG | 16 | Ar + 0.1% $CO_2$ | Ar | 250 | 30 | 30 | 15.0 |
| 17 | 1 | Comparative example | MIG | 16 | Ar + 2% $CO_2$ | Ar | 250 | 30 | 30 | 15.0 |
| 18 | 2 | | MIG | 16 | Ar + 4% $CO_2$ | Ar | 250 | 30 | 30 | 15.0 |
| 19 | 15 | | MIG | 16 | Ar + 0.4% $CO_2$ | Ar | 250 | 30 | 30 | 15.0 |
| 20 | 16 | | MIG | 16 | Ar + 0.4% $CO_2$ | Ar | 250 | 30 | 30 | 15.0 |
| 21 | 17 | | MIG | 16 | Ar | Ar | 250 | 30 | 30 | 15.0 |
| 22 | 18 | | MIG | 16 | Ar + 0.4% $CO_2$ | Ar | 250 | 30 | 30 | 15.0 |
| 23 | 19 | | MIG | 16 | Ar | Ar | 250 | 30 | 30 | 15.0 |
| 24 | 20 | | MIG | 16 | Ar | Ar | 250 | 30 | 30 | 15.0 |
| 25 | 21 | | MIG | 16 | Ar + 0.4% $CO_2$ | Ar | 250 | 30 | 30 | 15.0 |
| 26 | 22 | | MIG | 16 | Ar | Ar | 250 | 30 | 30 | 15.0 |
| 27 | 23 | | MIG | 16 | Ar + 0.4% $CO_2$ | Ar | 250 | 30 | 30 | 15.0 |
| 28 | 24 | | MIG | 16 | Ar + 0.4% $CO_2$ | Ar | 250 | 30 | 30 | 15.0 |
| 29 | 25 | | MIG | 16 | Ar + 0.1% $CO_2$ | Ar | 250 | 30 | 30 | 15.0 |
| 30 | 26 | | MIG | 16 | Ar + 0.1% $CO_2$ | Ar | 250 | 30 | 30 | 15.0 |

TABLE 4

| Composition of 9% Ni steel (mass %, the remainder is Fe) | | | | | | | | |
|---|---|---|---|---|---|---|---|---|
| C | Si | Mn | Ni | P | S | O | Al | Ti |
| 0.05 | 0.29 | 0.38 | 9.1 | 0.005 | 0.004 | 0.0020 | 0.035 | — |

Although the present invention has been described in detail with reference to particular embodiments, it should be understood by those skilled in the art that various alterations and modifications thereof may be made without departing from the spirit and the scope of the invention.

The present application is based on Japanese patent application (JP-2009-208495) filed on Sep. 9, 2009, the content of which is hereby incorporated by reference.

INDUSTRIAL APPLICABILITY

The present invention may achieve both an excellent bead shape and high ultralow-temperature toughness of a weld joint in welding between 9% Ni steel pieces by a highly efficient MIG welding process using a welding solid wire. Consequently, the excellent ultralow-temperature toughness of 9% Ni steel can be obtained through the highly efficient MIG welding process, and therefore the invention can be widely used for ultralow-temperature storage tanks for, for example, LNG, liquid nitrogen, and liquid oxygen, or various types of associated equipment thereof.

REFERENCE SIGNS LIST 1a, 1b: weld joint
2a, 2b: 9% Ni steel plate
3, 4: weld metal
5: backing metal

The invention claimed is:

1. A welding solid wire, comprising, in percent by mass:
C: more than 0% but no more than 0.10%;
Si: more than 0% but no more than 0.15%;
Mn: 0.1 to 0.8%;
Ni: 8.0 to 15.0%;
REM: 0.005 to 0.040%;
O: 0.0020 to 0.0150%;
Al: 0.03% or less;
Ti: 0.03% or less; and
Fe,
wherein a mass ratio of REM to O [REM]/[O] is from 3.1 to 4.2.

2. The welding solid wire according to claim 1, wherein the mass ratio [REM]/[O] is from 3.3 to 4.2.

3. A process of MIG welding of 9% Ni steel, the process comprising:
including the welding solid wire according to claim 1, and a shield gas selected from the group consisting of pure argon gas and argon gas comprising carbon dioxide of more than 0% but less than 2% into the MIG welding of 9% Ni steel.

4. A weld metal of a weld joint between 9% Ni steel pieces, the weld metal comprising, in percent by mass:
C: more than 0% but no more than 0.10%;
Si: more than 0% but no more than 0.15%;
Mn: 0.1 to 0.8%;
Ni: 8.0 to 15.0%;
REM: 0.005 to 0.040%;
O: more than 0% but no more than 0.015%;
Al: 0.03% or less;
Ti: 0.03% or less; and
Fe,
wherein
the weld metal has high strength and excellent ultralow-temperature toughness, and
a sectional structure of the weld metal observed by SEM of 1000 magnifications comprises oxides having a maximum diameter of from 0.1 to less than 1 μm, and an average number of the oxides is $1 \times 10^3$ to $5.0 \times 10^3$ per a visual field of 1 $mm^2$.

5. The weld metal according to claim 4, wherein
the weld metal is prepared by gas shield arc welding between the 9% Ni steel pieces with a welding solid wire and a shield gas,
the welding solid wire comprises, in percent by mass:
C: more than 0% but no more than 0.10%,
Si: more than 0% but no more than 0.15%,
Mn: 0.1 to 0.8%,
Ni: 8.0 to 15.0%,
REM: 0.005 to 0.040%,
O: 0.0020 to 0.0150%,
Al: 0.03% or less,
Ti: 0.03% or less, and
Fe,
a mass ratio of REM to O [REM]/[O] is from 2.5 to 4.2, and
the shield gas is pure argon gas or argon gas comprising carbon dioxide of more than 0% but less than 2%.

* * * * *